United States Patent
Aldridge et al.

[15] 3,674,814
[45] July 4, 1972

[54] PREPARATION OF DIHYDROTEREPHTHALATES

[72] Inventors: Gerald Richard Aldridge, Elizabeth; Felix Frederick Ehrich, Westfield; William Scott Struve, Chatham, all of N.J.

[73] Assignee: E. I. du Pont de Nemours and Company, Wilmington, Del.

[22] Filed: Jan. 19, 1970

[21] Appl. No.: 4,115

[52] U.S. Cl. ..................................260/396 N, 260/279 R
[51] Int. Cl. ..........................................................C07c 49/64
[58] Field of Search ...........................................260/396 N

[56] References Cited

UNITED STATES PATENTS 3,372,184   3/1968   Auster..............................260/471 R Primary Examiner—Lorraine A. Weinberger
Assistant Examiner—L. Arnold Thaxton
Attorney—Frank R. Ortolani

[57] ABSTRACT

A process for preparing a dialkyl 2,5-diarylamino-3,6-dihydroterephthalate by condensing an arylamine with a dialkyl succinylsuccinate in the presence of a salt formed from trifluoroacetic acid and a secondary or tertiary amine, as a catalyst. This results in improved yields and purity of products obtained by subsequent pyrolysis of the terephthalates.

7 Claims, No Drawings

PREPARATION OF DIHYDROTEREPHTHALATES

BACKGROUND OF THE INVENTION

U. S. Pat. No. 2,821,541 to W. S. Struve describes the condensation of a dialkyl succinylsuccinate with aniline, or substituted anilines, in the presence of an inert, high boiling medium and an acidic catalyst soluble in the reaction medium. In U S. Pat. No. 3,372,184 to Auster there is described an improvement on the Struve process in which the salt resulting from reaction of a portion of the arylamine with trifluoroacetic acid (TFA) is employed as catalyst.

In the known processes, an excess of the arylamine is needed to insure an acceptable yield of condensation product. Thereafter excess unreacted arylamine and residual catalyst should be removed before pyrolysis. For example, it has been found that as little as 1 percent of free parachloroaniline remaining after the condensation reaction and present during pyrolysis can cause a 10 percent loss in yield of the corresponding 2,9-dichlorodihydroquinacridone.

SUMMARY OF THE INVENTION

It has now been discovered that upon using secondary or tertiary amines to form salts of trifluoroacetic acid, which salts are thereafter used as catalyst in the condensation of a succinylsuccinate ester with a primary arylamine, such as aniline, the resulting condensation product is more readily obtained in form that pyrolyzes efficiently to the corresponding dihydroquinacridone. The process of this invention is essentially that set forth in the above-identified U. S. Pat. No. 3,372,184 to A. M. Auster, which is hereby incorporated herein in its entirety, by reference, the only essential difference being the use of the secondary or tertiary amine to form the catalytic salt. However, by employing the secondary or tertiary amine as stated, acceptable yields in pyrolysis to dihydroquinacridone are readily achieved without excess primary amine reactant, and the catalyst is readily removed at moderate temperature thereby avoiding tar and sludge formation and unnecessary degradation of the dihydroterephthalate.

The secondary and tertiary amines which can be used as a catalyst component in the process of this invention (1) are unreactive with the succinylsuccinate at the process conditions, (2) have a boiling point up to about 210° C. at atmospheric pressure, and (3) are more basic than the primary arylamine reactant (so that the salt of the secondary or tertiary amine will form rather than that of the primary amine). However, the secondary and tertiary amines should not be so basic that the minimum temperature to remove the catalyst as distillate is so high that the temperature degrades the desired condensation product. Further, the trifluoroacetic acid salt of the amine must be soluble in the liquid reaction medium for the salt to be an effective catalyst. Secondary and tertiary amines which form salts with trifluoroacetic acid and have been found useful in the present invention include: N-methylaniline, N,N-dimethylaniline, 2-picoline, pyridine, piperidine, and diethylamine. Other secondary and tertiary amines which can be used include N-ethylaniline, pyrrolidine, morpholine and such low boiling amines as dimethylamine (b.p. 7° C.) and trimethylamine (b.p. 4° C.). As will be evident to the artisan some catalysts may require preparation separately from the condensation reaction conditions in view, for example, of considerable volatility or analogous reason. Or, these amines can be introduced as gases into the condensation reaction system from pressurized cylinders.

In general the process involves condensing a mole of a dialkyl succinylsuccinate with two moles of a primary arylamine, the reaction being carried out in an inert diluent in the presence of the catalyst which consists of the salt of the secondary or tertiary amine and trifluoroacetic acid. The product dialkyl-diarylamino-dihydroterephthalate can be recovered from the reaction mass by conventional crystallization and filtration techniques, suitably after removal of catalyst and excess or unreacted primary amine.

The dihydroterephthalate is primarily useful for conversion to the corresponding dihydroquinacridone for application in the pigment art, after oxidation to quinacridone. Consequently, in a preferred modification the dihydroterephthalate is not separated, but rather is pyrolyzed in the reaction mixture and cyclizes to the dihydroquinacridone.

The invention is illustrated and described further in the following examples, which are not to be construed as limiting the discovery. Unless otherwise stated, all parts and percentages are by weight.

EXAMPLE I

For this reaction 104.4 grams (0.432 mole) of methyl-ethyl succinylsuccinate, 110.4 grams (0.864 mole) of parachloroaniline, and 9.0 grams (0.079 mole) of trifluoroacetic acid are mixed into 306 cc. of "Dowtherm A" (inert high boiling liquid, a eutectic mixture of 23.5 percent biphenyl and 76.5 percent diphenyl oxide). The mixture of reactants is placed in a glass-lined reactor equipped with a distillation column and condenser, and with means for introducing an inert atmosphere and for applying vacuum through the condensing system. With stirring there is added to these reactants 8.3 grams (0.078 mole) of N-methyl-aniline. While maintaining a vacuum of 20–30 mm. of mercury, the reaction mixture is heated to 85°–90° C. and held at this temperature for 30 minutes, resulting in a mixture of the methyl- and ethyl- 2,5-(4-chloroanilino)-3,6-dihydroterephthalate esters.

The reaction mixture in the flask is then blanketed with nitrogen and there is added to the flask 636 cc. of "Dowtherm A." The mixture is heated and a vacuum (20–30 mm. mercury) is applied to distill out 300 cc. of liquid. The reaction mixture in the flask is again blanketed with nitrogen, and an additional 300 cc. of "Dowtherm A" is added. The solution is then transferred at a temperature of 155°–165° C. to a heated addition funnel, and the solution is added from the funnel to 912 cc. of "Dowtherm A" which is maintained at a temperature of 255° C. or higher, the addition taking place over a 60 to 90 minute period of time. After this addition is completed, the mixture is stirred for 2 hours while maintaining the temperature at 250° C. The reaction mixture is cooled, filtered, washed free from "Dowtherm A" with methanol, and then dried. The yield obtained is 151.5 grams of 2,9-dichloro-dihydroquinacridone, representing a 92 percent yield on the succinylsuccinate used. This product converts to the corresponding quinacridone in a mixture of crystallographic phase, upon oxidation. Yields on the order of 96 percent, based on the dihydroquinacridone used, are obtained.

EXAMPLE II

For the reaction, 102 cc. of "Dowtherm A," 34.8 grams (0.144 mole) of methyl-ethyl succinylsuccinate, 36.8 grams (0.288 mole) of parachloroaniline, and 3.0 grams (0.026 mole) of trifluoroacetic acid are introduced into a distillation flask equipped, as in Example 1, with a distillation column and with means for applying an inert atmosphere and vacuum to the condensing system. The mixture is stirred and 3.15 grams (0.026 mole) of N,N-dimethylaniline are added. Vacuum is applied and maintained at 20–30 mm. mercury and the mixture is heated for 30 minutes at 85°–90° C., resulting in a mixture of the methyl- and ethyl- 2,5-(4-chloroanilino)-3,6-dihydroterephthalate esters, as in Example I.

This solution is then blanketed with nitrogen and 200 cc. of "Dowtherm A" are added. Vacuum is again applied, and 100 cc. of distillate taken off from the flask. Again the reaction mixture is blanketed with nitrogen, and 100 cc. of "Dowtherm A" added. The reaction mixture is then transferred to a heated addition funnel at a temperature of 155°–165° C. The solution is added, from the addition funnel to 304 cc. of "Dowtherm A" maintained at a temperature of 255° C., over a 60–90 minute period. When addition is complete, the mixture is stirred for 2 hours at 255° C., cooled, filtered, and washed free from "Dowtherm A" with methanol. The product is dried and shows a 90 percent yield of dihydroquinacridone (DQA) on the succinate used. Upon oxidation, this DQA product gives the corresponding quinacridone in a mixture of crystallographic phases in a yield of 95 percent based on the DQA used.

EXAMPLE III

The following reactants are mixed in a distillation flask as described in Examples I and II: 51 cc. of "Dowtherm A," 17.4 grams (0.072 moles) methyl- ethyl succinylsuccinate, 18.4 grams (0.144 mole) of parachloroaniline, and 1.5 gram (0.013 mole) trifluoroacetic acid. These reactants are stirred and 1.1 grams (0.13 mole) of pyridine are added. Vacuum is applied and maintained at 20–30 mm. mercury while the reactor and contents are heated for 30 minutes at a temperature of 85°–90° C. The contents of the flask are then blanketed with nitrogen, and 300 cc. of methanol added. The mixture is stirred, filtered, and washed free from "Dowtherm A" with methanol. The product after drying weighs 31.2 grams, which is a 94 percent yield of a mixture of methyl- and ethyl-2,5-(4-chloroanilino)-3,6dihydroterephthalate esters based on the amount of succinate used. The product is identified by infrared spectral analysis.

EXAMPLE IV

In a 1-liter four-neck flask, 78 ml. of "Dowtherm A," and 34.8 g. (0.144 mole) methyl-ethyl succinylsuccinate are stirred under nitrogen. 3.9 grams (0.034 mole) of trifluoroacetic acid and 47.6 grams (0.288 mole) of ethyl p-aminobenzoate are added to the flask. The ingredients are stirred, and 3.75 grams (0.036 mole) of N-methyl aniline are added. Under vacuum of 20–30 mm. Hg, the reaction mix is heated and held at 85°–90° C. Two hundred four ml. of "-Dowtherm A" are added, maximum vacuum is applied and 100 ml. of distillate are taken off. The final portion of this distillate is analyzed and found to contain 0.69 percent amine. Remaining in the flask is the product, a mixture of the methyl- and ethyl- 2,5-di(4-carbethoxyanilino)-3,6-dihydroterephthalate esters.

The flask contents are blanketed with nitrogen, heated to 150° to 160° C. and transferred under nitrogen to a heated addition funnel. In a 2-liter, four-neck flask, 184 ml. of "-Dowtherm A" are heated to 257° C. under nitrogen. The contents of the addition funnel are added to this "Dowtherm A" over a 60 minute period and hold for 5 hours. Then the mixture is cooled to 40°–60° C., filtered, and the precipitate washed free of "Dowtherm A" with methanol, and dried. The product is the corresponding 2,9-dicarbethoxy DQA in an amount of 52 g., an 80percent yield based on the succinate.

EXAMPLE V

For this reaction, 39 cc. of "Dowtherm A," 17.4 grams (0.072 mole) of methyl-ethyl succinylsuccinate, 23.8 grams (0.144 mole) of ethyl p-aminobenzoate, and 2.0 grams (0.017 mole) of trifluoroacetic acid are mixed. There is added to the mixture 1.9 grams (0.017 mole) of N-methyl aniline. Vacuum is applied at 20–30 mm. mercury and the mixture heated for 6 hours at 84°–90° C. The mixture is then blanketed with nitrogen and 300 cc. of methanol are added to the flask. The mixture is stirred, filtered, and washed free from "Dowtherm A" with methanol. The dried product weighs 34.4 grams, representing a 90 percent yield of a mixture of methyl- and ethyl- 2,5-(4-carbethoxyanilino)-3,6-dihydroterephthalate esters based on the amount of the reactants.

EXAMPLE VI

In this reaction, the following ingredients are mixed in a 2-liter two-neck distilling flask: 70.5 grams (0.287 mole) methyl-ethyl succinylsuccinate, 201.1 grams (1.576 mole) o-chloroaniline, 215 grams "Dowtherm A," and 1.94 grams of the trifluoroacetic acid salt of N-methyl aniline which salt is first separately prepared. The flask and contents are heated to 90°–95° C. under 10 mm. mercury vacuum for 2 hours with stirring. The temperature is then increased, while maintaining the vacuum, to distill out 219 ml. of un-reacted o-chloroaniline, "Dowtherm A," and the catalyst salt of trifluoroacetic acid and N-methylaniline. The flask at this point contains a mixture of the methyl- and ethyl 2,5-(2-chloroanilino)-3,6-dihydroterephthalate esters. The contents of the flask are then blanketed with nitrogen at atmospheric pressure, and at 150° C. 113 ml. of "Dowtherm A" added. The mixture is transferred to a heated 500 ml. dropping funnel, using an additional 133 ml. of "Dowtherm A" at 150° C. and blanketing the mixture with nitrogen during the transfer. At 150°–155° C., the solution is added over a 90 minute period from the dropping funnel to agitated "Dowtherm A" at 254° to 256° C. contained in a 5-liter, four-necked flask. At atmospheric pressure, 167 ml. of "Dowtherm A" and alcohol are removed by distillation. Stirring of the flask is continued for 30 minutes at 254°–256° C. The temperature of the flask is lowered to below 70° C. and the product recovered by filtration and washed "Dowtherm A"-free with methanol. The product is dried at 80° C. and a yield of greater than 96 percent based on the weight of reactants used is obtained. The product is 4,11-dichlorodihydroquinacridone.

EXAMPLE VII

To carry out the reaction, charge to a 2-liter four-neck flask as follows: 78 ml. "Dowtherm A," and 34.8 grams methyl-ethyl succinylsuccinate. The charge is stirred under a blanket of nitrogen, and there is added: 39.0 grams p-anisidine and 0.3 gram trifluoroacetic acid with stirring. There is then added 0.3 ml. of 2-picoline. Vacuum is maintained at 20–30 mm. and the contents of the flask heated to 85° to 90° C. for a period of 60 minutes. The product at this point is a mixture of the methyl- and ethyl-2,5-(4-methoxyanilino)-3,6-dihydroterephthalate esters.

To the flask under nitrogen are added 834 ml. of "-Dowtherm A," and maximum vacuum is applied to distill out 740 ml. of volatiles. The final 10 ml. of distillate is analyzed for the percent of amine present and found to be 0.065 percent amine by weight.

The residue remaining in the 2-liter four-neck flask is blanketed with nitrogen and the 204 ml. of "Dowtherm A" added. The flask contents are heated to 140° to 150° C. and transferred under nitrogen to a heated addition funnel. To carry out the pyrolysis step, a 3-liter four-neck flask is charged with 304 ml. of "Dowtherm A" and blanketed with nitrogen. This "Dowtherm A" is heated to 257° to 260° C. and the contents of the addition funnel are slowly added over a period of 60 minutes. At the conclusion of this addition, the flask contents are stirred for 1 hour while maintaining the temperature at 258° C., cooled to 40° C., filtered, washed free of "Dowtherm A" with methanol, and dried. The product is 2,9-(dimethoxy)dihydroquinacridone, obtained in 86 percent yield based on the amount of succinate used.

EXAMPLE VIII

Using equipment as generally described in Example VII, 78 ml. of "Dowtherm A," and 34.8 grams methyl-ethyl succinylsuccinate are stirred under nitrogen. To this add 37.1 grams p-anisidine and 0.5 ml. (0.75 g) trifluoroacetic acid. The flask contents are stirred, and there is added 0.7 ml. of diethylamine. Vacuum is maintained at 30–40 ml. while the flask contents are heated for 30 minutes at 105°–110° C. The product at this point is a mixture of the methyl- and ethyl-2,5-(4-methoxyanilino)-3,6-dihydroterephthalate esters. Under a blanket of nitrogen 454 ml. "Dowtherm A" are added to the flask and, under maximum vacuum, distillation is carried out to remove 400 ml. of distillate. The final 10 ml. of distillate show an amine content of 0.15 percent by weight. The product is then pyrolyzed as hereinbefore described to yield 2,9-dimethoxy-3,6-dihydroquinacridone in yield of 80 percent based on the succinate used.

EXAMPLE IX

To carry out this reaction, 39 ml. "Dowtherm A," 17.4 grams (0.072 mole) of methyl-ethyl succinylsuccinate, 18.6 grams (0.151 mole) p-anisidine, and 1.0 ml. (1.5 g.) trifluoroacetic acid are used. These reactants are stirred under a blanket of nitrogen, and 1.3 ml. of piperidine added. Vacuum is applied and maintained at 4–6 mm. Hg, and the flask contents heated for 30 minutes at 105° to 110° C. The flask contents are blanketed with nitrogen, and 300 ml. methanol added. The flask contents are stirred, filtered, washed "Dowtherm A" free with methanol and dried. The yield is found to be 32 grams of a mixture of methyl- and ethyl-2,5-(4-methoxyanilino)-3,6-dihydroterephthalate esters, which represents a 99 percent yield based on the succinate used.

EXAMPLE X

To carry out the reaction, in a 1-liter, four-neck flask, 123 ml. "Dowtherm A," and 34.8 grams (0.144 mole) methyl-ethyl succinylsuccinate are stirred under nitrogen. There is added to the flask at least a 2:1 molar ratio, based on the methyl-ethyl succinylsuccinate, of toluidine 0.3 g. (0.0026 mole) trifluoroacetic acid and, with stirring, 0.285 g (0.0031 mole) 2-picoline. The ingredients are stirred, and vacuum applied to 20–30 mm. Hg. The flask contents are heated for 30 minutes at a temperature of 85°–90° C. The product is a mixture of the methyl- and ethyl-2,5-di(4-methylanilino)-3,6-dihydroterephthalate esters. The contents are blanketed with nitrogen, and 400 ml. "Dowtherm A" added. Maximum vacuum is applied to the flask to distill out 430 ml. the final portion of this distillate analyzing 0.022 percent amine.

The flask contents are again blanketed with nitrogen, and 250 ml. "Dowtherm A" added and heat applied to bring the temperature to 150°–160° C. The flask contents are transferred to a heated addition funnel while maintaining a blanket of nitrogen.

To a 3-liter, 4-neck flask, 304 ml. "Dowtherm A" are added which is heated to 258° C. under a blanket of nitrogen. The contents of the addition funnel are added to the heated "Dowtherm A" over a period of 60 minutes, maintaining the temperature of the "Dowtherm A" at 258° C. After addition is complete, the flask contents are stirred for 1 hour at 258° C., cooled to 40° C., filtered, washed free of "Dowtherm A" with methanol and dried. The yield of substituted dihydroquinacridone in this experiment is 45.0 grams, representing a 93 percent yield based on the succinylsuccinate.

From the examples and data given to illustrate the invention, it is evident that the TFA salts of secondary and tertiary amines are effective catalysts in the condensation reaction of primary arylamines and dialkyl succinylsuccinate and that these salts are substantially completely removed from the product dihydroterephthalate by simple distillation procedures. This is shown above by the "percent amine" indicated in several examples. Certain collected data have shown that the amine content of distillate is reduced by 50 to 90 percent of what a control (obtained by use of primary amine-trifluoroacetic acid salt catalyst of the art) has shown. Since amine content present appears to adversely affect pyrolysis, it is evident that with this invention the disubstituted dihydroquinacridones which result by subsequent pyrolysis of the dihydroterephthalate products herein can be obtained in good yield and high purity.

As noted hereinbefore, in forming catalysts for practice of this discovery, the components may simply be added to the condensation reaction zone, or may be separately preformed and then added. In experience to date, it has been found useful to provide some excess secondary or tertiary amine, i.e., up to about 10 percent or more, to utilize all the trifluoroacetic acid present.

As taught in the cited Auster patent, the preferred amounts of catalyst, based on the amounts of succinate ester used, are in the range of about 0.01 mole to about 0.05 mole per mole of ester, but other relative quantities may be employed if desired. In addition, while the invention is generally applicable to the condensation of primary arylamines with dialkyl succinylsuccinates, preferred amines include aniline, o-chloroaniline, p-chloroaniline, o-toluidine, p-toluidine, p-anisidine, p-fluoroaniline, p-bromoaniline p-iodoaniline, p-butylaniline, p-butoxy aniline, beta naphthylamine, etc., as well as other alkyl- and alkoxy-substituted anilines in which the alkyl or alkoxy groups contain two to four carbon atoms.

The alkyl groups in the dialkyl succinylsuccinate can be derived from any of lower alkyl group containing up to 4 carbon atoms, such as methyl, ethyl, propyl, isopropyl, n-butyl or isobutyl. It is not necessary that the two alkyl groups be alike.

The inert high boiling liquid in which the reaction is carried out preferably comprises the eutectic mixture of 23.5 percent biphenyl and 76.5 percent diphenyl oxide commonly available in the trade as "Dowtherm A." However, many other inert liquids which boil within the range of about 225°–300° C. may be used including, by way of example, methyl naphthalenes, biphenyl, diphenyl oxide and like materials. For other detail, reference should be made to the Auster patent.

The present invention shows advantages over the known processes particularly by increasing the overall yield of the quinacridone products obtained by pyrolysis and oxidation of the dihydroterephthalates produced herein. In one study, yields of dihydroquinacridones obtained when using the present catalysts were compared with yields when no such catalysts were employed. In all instances, significant improvement occurred. For example, the dihydroquinacridone yield from the pyrolyzed product obtained upon condensing p-chloroaniline with the succinylsuccinate increased from 80 to about 90 percent. In addition, the ease with which catalysts of this invention may be removed by distillation along with unreacted primary amine, unreacted succinylsuccinate and "Dowtherm A" contributes to purity of the final pigment products which may be prepared, and contributes to avoiding sludge and tar in the equipment used.

What is claimed is:

1. In a process for condensation of dialkyl succinylsuccinate with a primary amine in an inert reaction medium to form a dialkyl diarylamine-3,6-dihydroterephthalate in the presence of a salt of trifluoroacetic acid as a catalyst, the improvement comprising effecting said condensation using as said catalyst the salt of trifluoroacetic acid and a secondary or tertiary amine.

2. A process according to claim 1 in which said inert medium comprises a eutectic melt of biphenyl and diphenyl oxide and said secondary or tertiary amine is selected from the group consisting of N-methylaniline, N-N-dimethylaniline, pyridine, piperidine, 2-picoline and diethylamine.

3. In a process for preparing a dialkyl 2,5-di(4-chloroanilino)-3,6-dihydroterephthalate by condensing p-chloroaniline and a dialkyl succinylsuccinate in an inert medium in the presence of a salt of trifluoroacetic acid as a catalyst, the improvement comprising effecting said condensation using as said catalyst a member of the group consisting of N-methylanilinium trifluoroacetate, dimethylanilinium trifluoroacetate and pyridinium trifluoroacetate.

4. A process for the production of methyl-ethyl 2,5-di(4-carbethoxyanilino)-3,6-dihydroterephthalate comprising condensing ethyl p-aminobenzoate and methyl-ethyl succinylsuccinate in an inert medium in the presence of N-methylanilinium trifluoroacetate as catalyst.

5. A process for the production of methyl-ethyl 2,5-di(2-chloroanilino)-3,6-dihydroterephthalate comprising condensing o-chloroaniline and methyl-ethyl succinylsuccinate in an inert medium in the presence of N-methylanilinium trifluoroacetate as catalyst.

6. In a process for preparing methy-ethyl 2,5-di(4-methoxyanilino)-3,6-dihydroterephthalate by condensing p-anisidine and methyl-ethyl succinylsuccinate in an inert medium in the presence of a catalyst, the improvement comprising effecting said condensation in the presence of a member of the group consisting of diethylamine trifluoroacetate, piperidinium trifluoroacetate, and 2-picolinium trifluoroacetate as catalyst.

7. A process for the production of methyl-ethyl 2,5-di(4-methylanilino)-3,6-dihydroterephthalate comprising condensing p-toluidine and methyl-ethyl succinylsuccinate in an inert medium in the presence of 2-picolinium trifluoroacetate as catalyst.

* * * * *